United States Patent
Marotta

(10) Patent No.: US 7,301,894 B1
(45) Date of Patent: Nov. 27, 2007

(54) METHOD FOR PROVIDING FAULT TOLERANCE IN AN XDSL SYSTEM

(75) Inventor: Peter Marotta, Oak Park, IL (US)

(73) Assignee: Westell Technologies, Inc., Aurora, IL (US)

( * ) Notice: Subject to any disclaimer, the term of this patent is extended or adjusted under 35 U.S.C. 154(b) by 995 days.

(21) Appl. No.: 10/106,271

(22) Filed: Mar. 25, 2002

(51) Int. Cl.
*G01R 31/08* (2006.01)

(52) U.S. Cl. .................. 370/217; 370/352; 370/493

(58) Field of Classification Search ............... 370/216, 370/217, 218, 219, 220, 221, 225, 226, 227, 370/228, 395.41, 395.61
See application file for complete search history.

(56) References Cited

U.S. PATENT DOCUMENTS

| | | | | |
|---|---|---|---|---|
| 5,729,527 | A | * | 3/1998 | Gerstel et al. ............... 370/228 |
| 5,852,630 | A | | 12/1998 | Langberg et al. ........... 375/219 |
| 6,005,841 | A | * | 12/1999 | Kicklighter .................. 370/217 |
| 6,181,775 | B1 | | 1/2001 | Bella ............................ 379/29 |
| 6,205,522 | B1 | | 3/2001 | Hudson et al. .............. 711/147 |
| 6,212,259 | B1 | | 4/2001 | Kiko ............................ 379/34 |
| 6,278,769 | B1 | | 8/2001 | Bella ........................ 379/29.11 |
| 6,298,046 | B1 | | 10/2001 | Thiele ......................... 370/282 |
| 6,351,452 | B1 | * | 2/2002 | Koenig et al. ............... 370/217 |
| 6,385,203 | B2 | * | 5/2002 | McHale et al. .............. 370/401 |
| 6,751,191 | B1 | * | 6/2004 | Kanekar et al. ............. 370/217 |
| 6,876,625 | B1 | * | 4/2005 | McAllister et al. .......... 370/221 |
| 6,910,148 | B1 | * | 6/2005 | Ho et al. ....................... 714/4 |
| 6,978,015 | B1 | * | 12/2005 | Erickson et al. ............. 379/417 |
| 6,996,108 | B1 | * | 2/2006 | Budhraja ................ 370/395.41 |
| 6,999,517 | B1 | * | 2/2006 | Bombay et al. ............. 375/257 |
| 7,065,098 | B2 | * | 6/2006 | Struhsaker et al. .......... 370/429 |
| 7,142,591 | B2 | * | 11/2006 | Kelliher ....................... 375/222 |
| 2001/0038606 | A1 | * | 11/2001 | Furudate et al. ............. 370/217 |
| 2002/0021661 | A1 | * | 2/2002 | DeGrandpre et al. ........ 370/219 |
| 2002/0097670 | A1 | * | 7/2002 | Struhsaker et al. .......... 370/210 |
| 2002/0176355 | A1 | * | 11/2002 | Mimms et al. .............. 370/216 |
| 2004/0246977 | A1 | * | 12/2004 | Dove et al. ............. 370/395.61 |

OTHER PUBLICATIONS

Saarela, Kimmo K., "ADSL," Tampere University of Technology, Telecommunications Laboratory, 1995.

* cited by examiner

*Primary Examiner*—Phirin Sam
(74) *Attorney, Agent, or Firm*—McDonnell Boehnen Hulbert & Berghoff LLP

(57) ABSTRACT

An XDSL system may include an active unit and a standby unit. The active unit may include a plurality of line circuits, which can be used to form XDSL loops with far end units. The standby unit may be synchronized with the active unit. In response to an indication, such as a fault, the TDM system may switch from the active unit to the standby unit. Then, the standby units may be used to form the XDSL loops with the far end units.

31 Claims, 12 Drawing Sheets

METHOD FOR PROVIDING FAULT TOLERANCE IN AN XDSL SYSTEM

FIELD OF THE INVENTION

This invention relates generally to XDSL transmission systems. More specifically, it relates to fault tolerance in XDSL transmission systems.

BACKGROUND OF THE INVENTION

XDSL is a technology that overcomes some of the limitations of plain old telephone service ("POTS"). The acronym XDSL generally identifies the broad class of "digital subscriber line" services. The letter "X" in the general acronym can be replaced with another letter to identify a specific type of digital subscriber line service, such as asymmetric digital subscriber line ("ADSL") service or high-bit-rate digital subscriber line ("HDSL"). Using XDSL, the bandwidth of a carrier loop can be extended to support higher speed data communications than provided by POTS, and the carrier loop may support simultaneous voice and data communications.

The carrier loop can be formed by connecting a line card, generally located at a central office, with a far end unit. The far end unit may be, for example, an XDSL device. The central office can generally house one or more network interfaces. A network interface may include multiple line cards, each of which may connect to a different far end unit.

Various problems, such as faults, may occur within an XDSL transmission system. For example, physical problems may develop on the connections between the far end units and the line cards. In another example, one or more components in the XDSL system may physically fail. Other problems can also develop.

In order to prevent a problem on one carrier loop from affecting the other carrier loops, the network interface typically provides a complete set of circuitry for each line card. For example, the network interface may have separate control circuits and power supplies for each line card. That way, if a control circuit or power supply fails, it will not affect the operation of the other line cards. Also, a failure in a carrier loop will not be reflected back through the common circuitry to the other carrier loops. While this provides some degree of protection against transmission problems, the use of separate circuitry for each line card increases the total number of components in the network interface. This can increase both the cost and complexity of the network interface.

In another method of providing fault tolerance in an XDSL transmission system, the network interface may be matched with a corresponding standby interface. In the event of a problem in one or more of the carrier loops, the XDSL system can switch from using the network interface to using the standby interface. This implementation, however, has disadvantages. In addition to the carrier loop having the problems, other non-affected carrier loops are also switched from using the network interface to using the standby interface. In order to continue communication with the far end units, the line cards in the standby network interface should be initialized with the far end units. For example, according to some current XDSL standards, the initialization process can be on the order of thirty seconds. Therefore, the carrier loops that are unaffected by the problem in the XDSL system may still experience an outage of service greater than thirty seconds while the far end units initialize with the new line cards in the standby interface.

Therefore, there exists a need to provide an improved method for providing fault tolerance in an XDSL system.

SUMMARY OF THE INVENTION

In an XDSL system, a network interface can include a plurality of active line circuits. The line circuits may connect to far end units to form carrier loops for XDSL service. The network interface may further include a plurality of standby line circuits. The standby line circuits may be synchronized with the active line circuits. When the active line circuits receive data from the far end units, the data may also be used to update the standby line circuits so that they can remain synchronized with the active line circuits. Then, the standby line circuits may replace the active line circuits, and the standby line circuits can form the carrier loops with the far end units.

In another principal aspect, the standby line circuits may connect to standby far end units. The standby far end units may receive data that was sent from the far end units to the active line circuits. The standby far end units may use the data to provide signals to the standby line circuits representing the data received by the active line circuits. The standby line circuits can update their states using the data received from the standby far end units so that the states of the standby line circuits are synchronized with the states of the active line circuits. Then, the standby line circuits can replace the active line circuits to form carrier loops with the far end units.

These as well as other aspects and advantages of the present invention will become apparent from reading the following detailed description, with appropriate reference to the accompanying drawings.

BRIEF DESCRIPTION OF THE DRAWINGS

Exemplary embodiments of the present invention are described herein with reference to the drawings, in which.

DETAILED DESCRIPTION OF EXEMPLARY EMBODIMENTS

Figure 1:
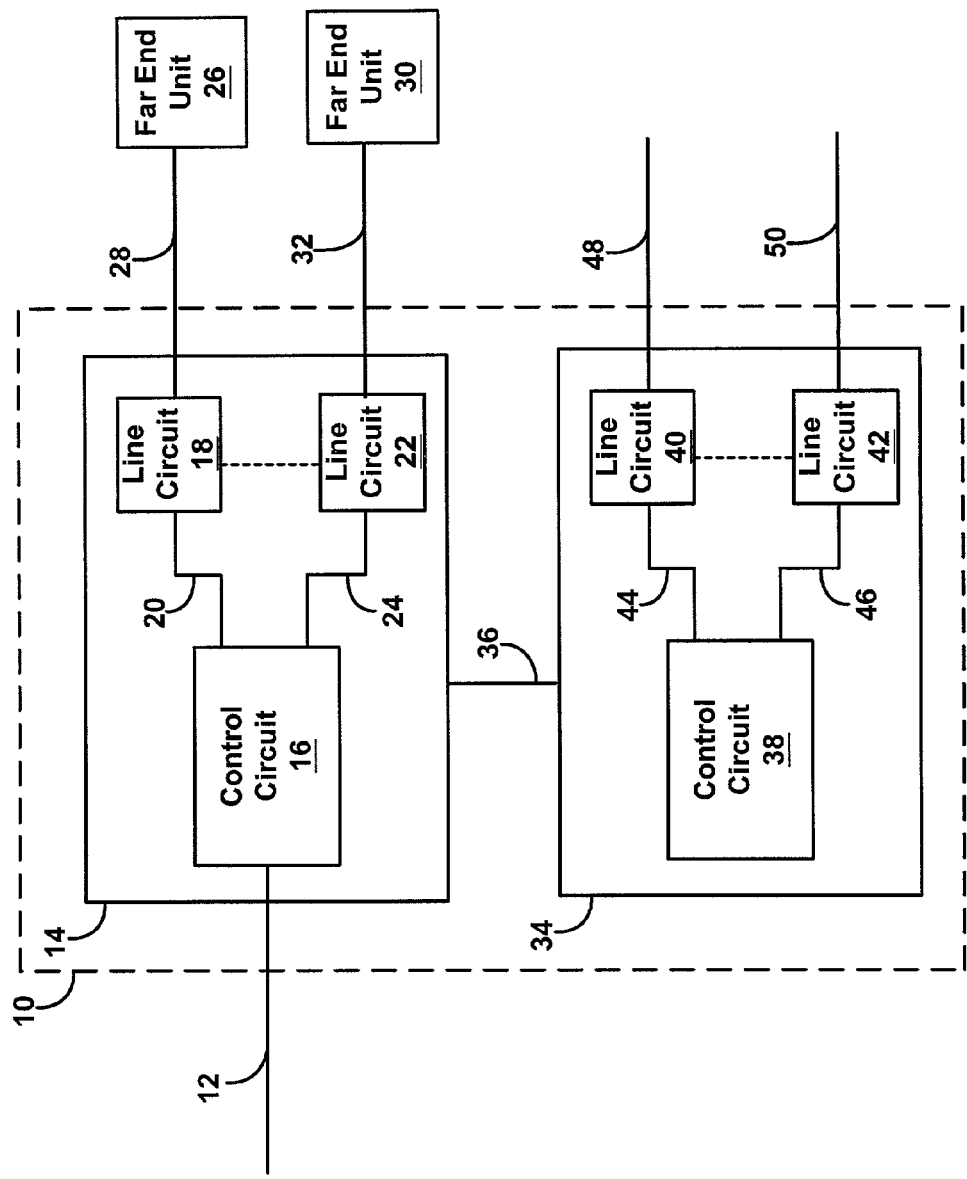
FIG. 1 is a block diagram of a network interface in an XDSL transmission system that may be used to practice the exemplary embodiments.

FIG. 1 is a block diagram of a network interface that may be used to practice the exemplary embodiments. The network interface 10 may be used in a time division multiplexing ("TDM") system, such as an XDSL system. The network interface 10 can connect to a TDM transmission line 12. The TDM transmission line 12 can be used to carry multiple signals. As is known in the art, TDM is a method used to interleave multiple signals on a single data link in the time domain.

The TDM transmission line 12 may be used, for example, to carry high-capacity signals in a telecommunications system. In an exemplary embodiment, the TDM transmission line 12 may carry T1, DS2, DS3 or other TDM signals. The TDM transmission line 12 may carry a combination of voice and data signals, and these signals may eventually be connected to various different subscriber loops.

The network interface 10 may include an active unit 14. The active unit 14 may connect to the TDM transmission line 12. The TDM transmission line 12 can connect to a control circuit 16 within the active unit 14. The control circuit 16 may perform various functions, such as demultiplexing the TDM signals carried by the TDM transmission line 12. As is known in the art, demultiplexing is the process of separating multiplexed signals. The de-multiplexed signals can be provided to a plurality of line circuits.

A line circuit 18 can receive one of the demultiplexed signals over a data line 20. Another line circuit 22 can receive a different demultiplexed signal over a data line 24. While FIG. 1 shows the active unit 14 having two line circuits 18, 22, it may also include a greater number of line circuits, indicated generally by the dashed line between the line circuits 18, 22.

The number of line circuits, for example, may correspond with the number of TDM signals carried by the TDM transmission line 12. For example, a DS3 line may carry up to twenty-eight different multiplexed signals, and the active unit 14 may correspondingly have twenty-eight line units. Of course, the active unit 14 may have a greater or fewer number of line circuits, and the number of line circuits may differ from the number of time slots in the specific type of TDM transmission line 12.

The control circuit 16 may include various components that can be shared among the different line circuits 18, 22. For example, the control circuit 16 may include a single demultiplexer that can be used to separate the TDM signals carried by the TDM transmission line 12. Additionally, the control circuit 16 may include a power supply that can be used to provide power to the line circuits 18, 22, and the control circuit 16 may include a processor. The processor can be use to control various different components in the active unit 14.

The use of shared components within the active unit 14 can be advantageous for several different reasons. For example, the use of shared components can reduce the number of components needed within the active unit 14. This can reduce the cost of the active unit 14 as well as reducing the size of the active unit 14. The lesser number of components also can reduce the failure rate of the active unit 14, because the active unit 14 may have fewer components that can develop problems. The fewer number of components also decreases the complexity of designing and implementing the active unit 14. These benefits are not exhaustive, and other benefits may also exist.

Each line circuit 18, 22 may connect to a far end unit. For example, one line circuit 18 may connect to far end unit 26 over a transmission line 28, and another line circuit 22 may also connect to far end unit 30 over a different transmission line 32. The transmission lines 28, 32 may be a variety of different types of lines. For example, they may be twisted-pair copper wire transmission lines, such as the type use to provide plain old telephone service ("POTS"); however, other types of wiring may also be used.

The far end units 26, 30 may be, for example, XDSL devices. The far end units 26, 30 may connect to the active unit 14 to provide XDSL service. In one exemplary embodiment, the far end units 26, 30 may be XDSL modems. An XDSL modem generally handles the XDSL signaling used for communication with the active unit 14. The XDSL modem can receive signals sent over the transmission lines 28, 32, and it can decode the signals and provide the signals to an attached device, such as a computer. The XDSL modem can also receive data from the device, encode the data into an XDSL signaling format and send the data over the transmission lines 28, 32 to the active unit 14.

In exemplary embodiments, various different types of XDSL service may be used. For example, Asymmetric Digital Subscriber Line ("ADSL"), High-bit-rate Digital Subscriber Line ("HDSL"), HDSL2, Symmetric Digital Subscriber Line ("SDSL"), Very High Data Digital Subscriber Line ("VDSL") or other DSL services may be used to communicate with the far end devices. Of course, while XDSL systems may be used, other TDM systems may also be used.

XDSL provides a method for sending simultaneous voice and data transmissions on a single customer loop. In one exemplary embodiment, the transmission line 28 between the line circuit 18 and the far end unit 26 can carry data, such as can be used in an Internet or other network connection, and the transmission line 28 may also carry voice traffic. Multiple devices, such as computers and POTS telephones can connect to the far end unit 26 for communication with the line circuit 18. A similar connection can occur between the other far end unit 30 and the line circuit 22.

While the XDSL system may support simultaneous data and voice traffic on the same transmission line, it is not necessary that both occur at the same time. For example, the transmission line 28 may carry only voice traffic, it may carry only data traffic or it may carry both. Additionally, while one transmission line 28 may be engaged in a session that includes both types of traffic, the other transmission line may be engaged in a different type of session, such as voice only. Other combinations, of course, are possible, and these examples are merely exemplary in nature.

The various different implementation details of supporting both voice and data traffic can depend on the specific XDSL type used by the system. In one exemplary embodiment, the XDSL system may be an ADSL system. In an ADSL system, the available bandwidth can generally be divided into three frequency ranges. One frequency range can be used to carry voice traffic, while the other two frequency ranges may be used to carry data traffic. One of the data traffic frequency ranges can carry data sent from the far end unit 26 to the line 18, while the other data traffic frequency range can carry data sent from the line circuit 18 to the far end unit 26. ADSL is merely exemplary in nature, and other XDSL systems may also be used and their operation may differ from ADSL.

ADSL is described in more detail in American National Standard Institute ("ANSI") standard T1.413-1998, which is incorporated herein by reference in its entirety. HDSL is described in more detail in ANSI standard TR-No. 28, which is incorporated herein by reference in its entirety. HDSL2 is described in more detail in ANSI standard T1.418-2000, which is incorporated herein by reference in its entirety. SDSL is described in more detail in European Telecommunications Standards Institute ("ETSI") standard TS-101 524-2-V1.1.1-2000-04, which is incorporated herein by reference in its entirety. VDSL is described in more detail in ETSI standard TS-101 270-1 V1.2.1-1999-10, which is incorporated herein by reference in its entirety. More information on ANSI standards may be found at ANSI's website, whose URL is "www.ansi.org." Additional information on ETSI standards may be found at "www.etsi.org."

The network interface 10 may also include a standby unit 34. The standby unit 34 may be linked to the active unit 14 over a data link 36. While depicted as a single connection, the data link 36 may include a plurality of different connections between the active unit 14 and the standby unit 34. The connection between the active unit 14 and the standby unit 34 can be used to switch between the units during the operation of the XDSL system. This functionality can be used, for example, to provide fault tolerance in the XDSL system.

The standby unit 34 may also include a control circuit 38, and the control unit 38 may connect to one or more line circuits 40, 42. For example, the control circuit 38 may connect to one line circuit 40 over a data link 44, and the control circuit 38 may connect to another line circuit 42 over a different data link 46. While FIG. 1 illustrates the standby unit 34 having two line circuits 40, 42, it may also include a greater number of line circuits, indicated generally by the dashed line connecting the line circuits 40, 42. The use of shared components in the standby unit 34 can have many of the same benefits as previous described for the active unit 14, such as reduced cost and reduced circuitry.

Each line circuit 40, 42 may also include an output. One line circuit 40 may have one output 48, while the other line circuit 42 may have a different output 50. As with the active unit 14, the outputs 48, 50 may be twisted-pair copper wires; however, other types may also be used. In this configuration, however, the outputs 48, 50 are generally not connected to the far end units 26, 30. Connecting multiple line circuits 18, 40 to the same far end unit 26 may violate the various XDSL standards, and it may further cause the active unit 14 and the standby unit 34 to lose synchronization with each other.

The outputs, however, may be selectively connectable to the far end units. For example, output 48 may be selectively connectable to one far end unit 26, while the other output 50 may be selectively connectable to the other far end unit 30. This may be done, for example by using switches or relays. Of course, other devices may also be used. While the outputs may be selectively connectable to the far end units 26, 30, the far end unit may similarly be selectively disconnectable from the active unit 14 outputs 28, 32.

In order to maintain synchronization with the active unit 14 when not connected to the far end units 26, 30, the standby unit 36 may receive data from the active unit 14 over the data link 36. The data link 36 may be used to synchronize the standby unit 34 with the active unit 14. The data link 36 may also be used to provide data received from the far end unit 26 to the line circuit 40 located in the standby unit 34. That data may then be used to update the state of the line circuit 40 to reflect the state of the corresponding line circuit 18 in the active unit 14.

In the event of an indication to switch the XDSL system from using the active card 14 to using the standby card 34, the standby unit 34 can seamlessly replace the active unit 14. Since the standby unit 34 can be continuously updated to remain synchronized with the active unit 14, the standby unit 34 can be switched in to the connection between the far end unit 26 and the TDM transmission line 12 to replace the active unit 14. This transition can appear transparent to the far end unit 26, and it may occur without a noticeable disruption in service to the far end unit 26. Similarly, when the transition between the active unit 14 and the far end unit occurs 34, the other line circuits 22 in the active unit 14 can be switched to the corresponding line circuits 42 in the standby unit 34. This can also occur seamlessly to the far end unit 30 without a noticeable disruption in service.

Figure 2:
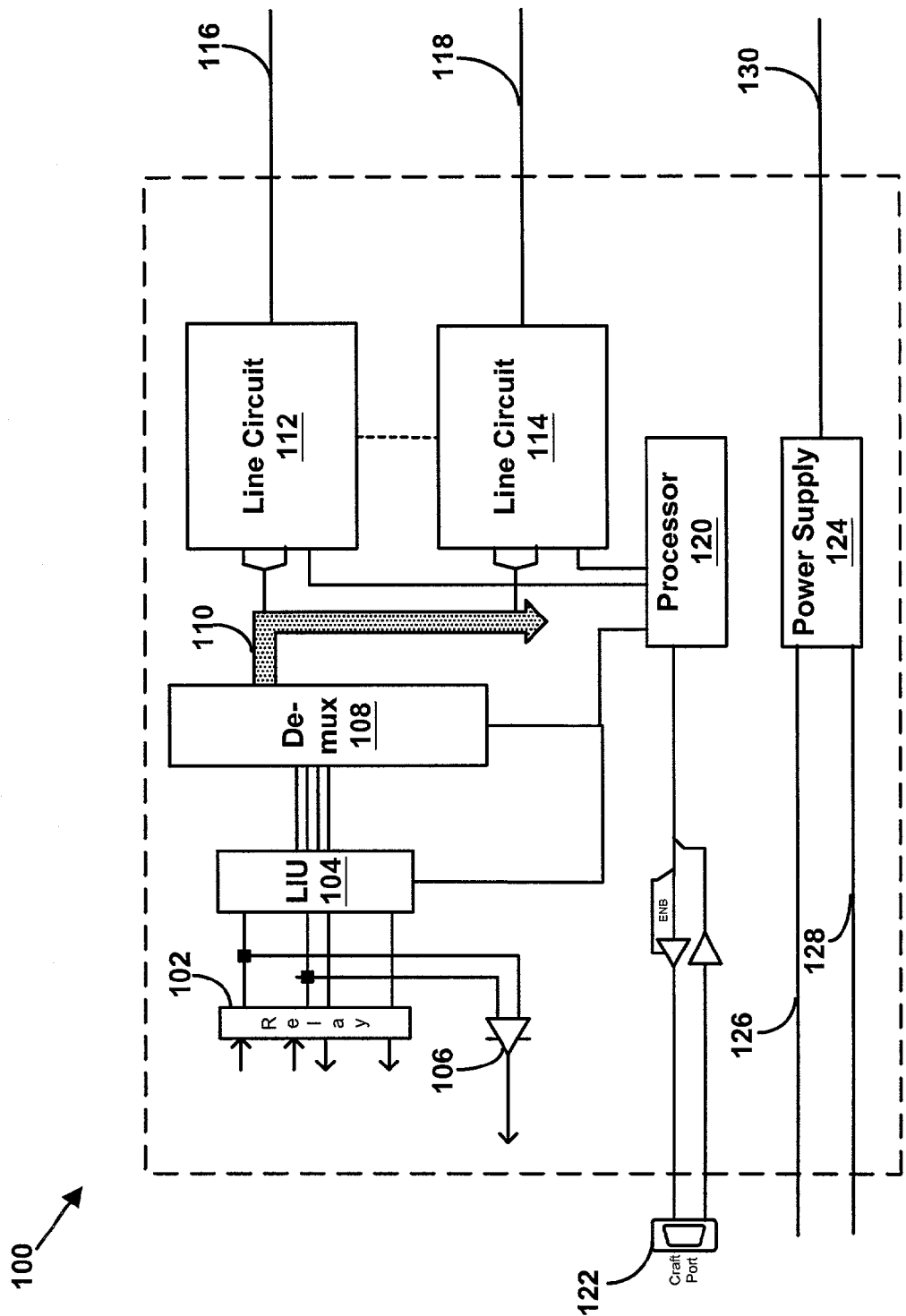
FIG. 2 shows an exemplary block diagram of a DSL unit that may be used in the network interface of FIG. 1.

FIG. 2 shows an exemplary block diagram of a DSL unit 100. The DSL unit 100 may be used, for example, as the active unit 14 or the standby unit 34 of FIG. 1. The DSL unit 100 may interface with the TDM transmission line 12 at the relay 102. The relay 102 can be used to connect the DSL unit 100 to the TDM transmission line, and it can also be use to isolate the TDM transmission line 12 from the DSL unit 100.

The relay 102 can connect to a line interface unit 104. The line interface unit 104 can receive signals sent over the TDM transmission line 104, and it may convert the signals into digital signals. In addition to connecting to the line interface unit 104, a monitor 106 may also connect to the relay 102. The monitor 106 can allow the DSL unit 100 to synchronize with the incoming signal, such as from the TDM transmission line 12, without causing a disruption or a distortion of the signal quality.

The line interface unit 104 can pass the digital signals to a demultiplexer 108. The demultiplexer 108 can demultiplex the signals received from the line interface unit 104. The output of the demultiplexer 108 may be connected to a bus 110. The bus 110 can carry the output of the demultiplexer 108 to multiple line circuits 112, 114. For example, the bus may connect to two line circuits 112, 114; however, as indicated by the dashed line connecting the line circuits 112, 114, the DSL unit 100 may include more than two line circuits. In an exemplary embodiment, the DSL unit may include the same number of line circuits as the number of time slots in the TDM transmission line 12. Other numbers may be used as well.

The line circuit 112 may connect to a far end unit over an output 116, and it may form an XDSL loop with the far end unit. The XDSL loop can be use to carry, for example, voice and data communications between the far end unit and the line circuit 112. Similarly, the other line circuit 114 may also connect to another far end unit via an output 118, and it may also form an XDSL loop with the other far end unit. Similarly, this connection may also be used to carry voice and data traffic between the far end unit and the line circuit 118.

A processor 120 may also connect to the line units 112, 114. The processor 120 may perform various functions, such as executing software programs and performing other system functions. For example, the processor 120 may initialize hardware components, initialize database structures and initialize program variables. The processor 120 may also control activities involving hardware and software structures, and it may also maintain hardware and software structures. In another example, the processor 120 may report on the performance of hardware and software structures, and it may handle faults that occur in the hardware and software structures. These examples are not exhaustive, and the processor 120 may be used to perform other functions.

The processor 120 may be any number of different types of computational devices. In one exemplary embodiment, the processor 120 may be a microprocessor. In another exemplary embodiment, the processor may be a microcontroller. In yet another embodiment, the processor may be an application specific integrated circuit ("ASIC"). These examples are not exhaustive, and other types of devices may also be used.

The processor 120 may also connect to a craft port 122. The craft port 122 may be externally accessible, and it can be used to monitor the internal operation of the DSL unit 100. Through the processor 120, the craft port 122 can access the line circuits 112, 114. Similarly, the craft port 122 can also access the line interface unit 104 and the demultiplexer 108 through the processor 120. Using the connectivity provided by the processor 120, the craft port 122 can be used to monitor various signals within the DSL unit 100.

The DSL unit 100 may also include a power supply 124. The power supply may receive redundant inputs 126, 128, comprising positive and negative voltage terminals. The power supply 124 may convert the inputted signal into different output voltages, it may convert the inputted signal into a different waveform, or it may perform other types of processing on the inputted voltage signal. The power supply 124 can provide power to each of the line units 112, 114, and it may also provide power to other components in the DSL unit 100. The power supply 124 may additionally provide an output 130 that may be used to provide power to one or more other elements.

Figure 3:
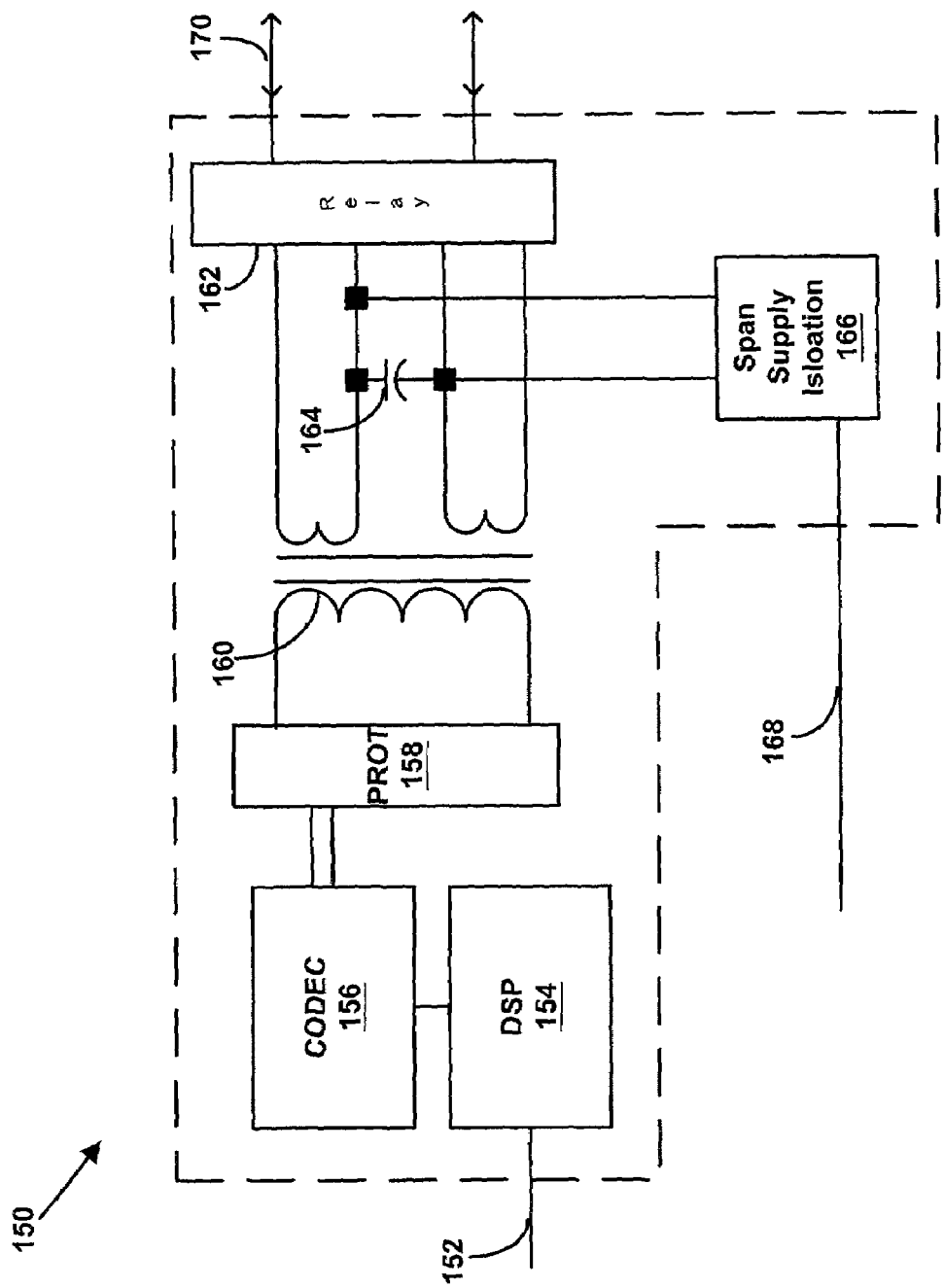
FIG. 3 shows an exemplary line circuit that may be used in the DSL unit of FIG. 2.

FIG. 3 shows an exemplary line circuit that may be used, for example, as the line circuit of FIG. 1 or 2. The line circuit 150 receives an input from data line 152. For example, the data line 152 may be connected to the bus 100 depicted in FIG. 2. Then, the data line 152 may carry as input a demultiplexed signal from the TDM transmission line 12. The data line 152 also connects to a digital signal processor ("DSP") 154. The DSP can perform various different processing functions on the inputted signals. The output of the DSP can be a digital signal, and it can be inputted to a CODEC 156. The CODEC 156 can convert the digital signal into an analog signal, which is then linked to a PROT 158.

The PROT 158 can provide environmental protection for the line circuit 150. It may protect against interference from a variety of different environmental factors. For example, it may protect the line circuit 150 from lightening strikes, temperature variations, water damage or other factors. These different factors can cause a disruption of the communication between the line circuit 150 and a far end unit. By providing protection, the PROT 158 can reduce the communication disruptions due to these various environmental factors.

The PROT 158 can connect through a transformer 160 to a relay 162. The transformer 160 can be used to convert the analog signal, such as by stepping up or stepping down its voltage. The transformer 160 may also provide isolation. The transformer 160 may prevent DC voltages from being coupled from one side to the other while still allowing time varying or AC signals to pass. The transformer 160 may do this, for example, by providing a resistance to the signal with respect to the frequency.

The transformer 160 can be a magnetic core, center tap transformer. A capacitor 164 can connect across the center tap. Each end of the capacitor 164 can be connected to a span supply isolation module 166. The span supply isolation module 166 can receive an input, for example from the power supply 124. The span supply isolation module 166 can provide power to the transformer 160 while also isolating it from the power supply 124

The relay 162 can provide two outputs 170, 172. The two outputs 170, 172 may connect to a far end unit in order to complete the DSL loop. The connection to the far end unit may be, for example, over a twisted-pair copper wire; however, other types of connections may also be used. The relay 162 can be used to selectively engage and disengage the line circuit 150 from the far end unit.

Figure 4:
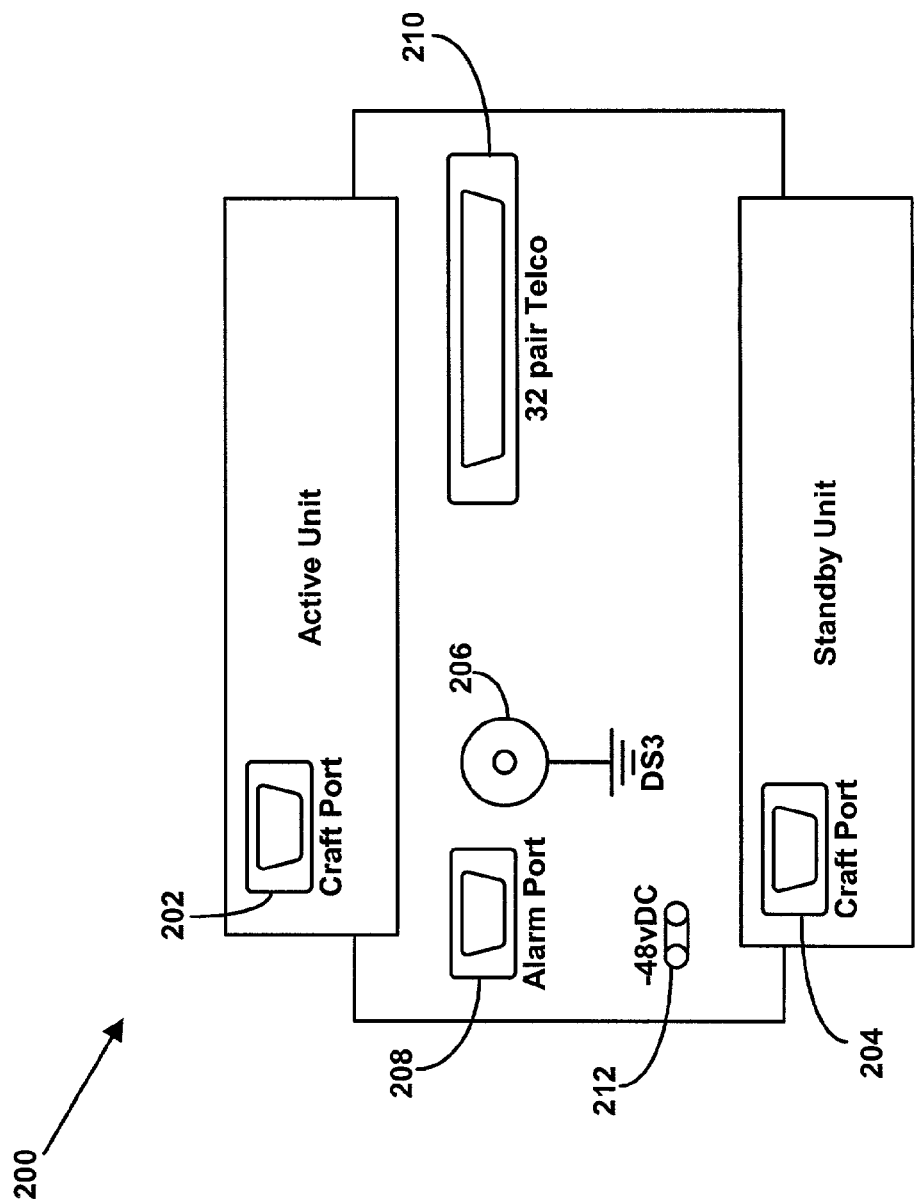
FIG. 4 shows a front view of a carrier frame that can be used to house an active unit and a standby unit.

FIG. 4 shows a front view of a carrier frame 200 that can be used to house the active unit 14 and the standby unit 34. The carrier frame 200 can provide mechanical support and electrical connectivity for signals, such as network DS3 TDM signal, tip and ring outside plant signals, power supply signals, craft port communication signals or other signals. The carrier frame 200 may also provide inter-module signals for the switchover process between the active unit 14 and the standby unit 34. Additionally, the carrier frame 200 can allow an equipment user to install wiring at one time; subsequent circuit changes may then be made without affecting the existing wiring configuration.

An alarm port 208 can provide a signaling interface for automatic notification of a fault within the carrier frame 200. The alarm port 208 can be connected to an alarm monitoring system within the network. The 32-pair telco interface 210 can provide an output for the active and standby units. It can aggregate the Tip and Ring signal wire connections to the far end units. It should be understood, however, that the 32-pair telco interface 210 is exemplary in nature and that other types of connections may also be used. The power input 212 can connect, for example, to a DC network power line. The power input 212 may also connect, for example, to the two inputs 126, 128 to the power supply 124.

The carrier frame 200 is exemplary in nature, and various other modifications may be made. For example, the carrier frame 200 may have different types of inputs, and it may be able to connect to multiple input signals. In another embodiment, the carrier frame 200 may connect to a different power input. In yet another embodiment, the carrier frame 200 may house more than one active unit 14, or it may house more than one standby unit 34. Other variations are also possible.

Figure 5:
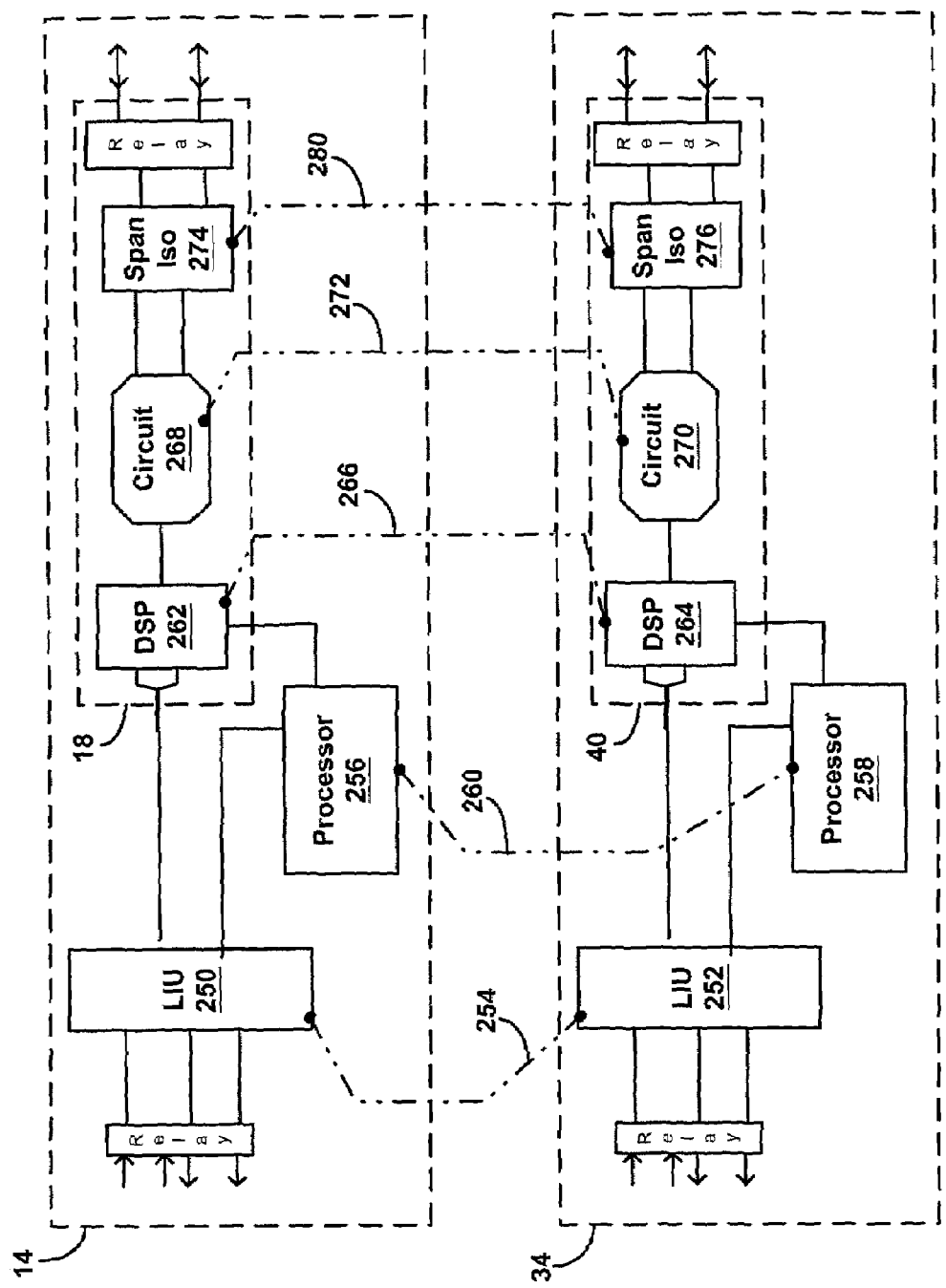
FIG. 5 is block diagram showing an exemplary embodiment for connecting the active unit and the standby unit.

FIG. 5 is block diagram showing an exemplary embodiment for connecting the active unit 14 and the standby unit 34. As was previously described, the active unit 14 and the standby unit 34 may be connected together in order to provide redundancy in the XDSL transmission system. In one exemplary embodiment, the active unit 14 and the standby unit 34 may be synchronized so that they reflect the same states. Data received by the active unit 14 can be passed to the standby unit 34 over their connections, and the data can be used to update the standby unit 34 so that its state matches the state of the active unit 14.

In order to properly synchronize the standby unit 34 with the active unit 14, they may be connected at various different points both physically and logically. The different connections can allow the standby unit to be isolated from the TDM transmission line 12 and the connections 28, 32 with the far end units 26, 30. Also, the various different connections can allow the active unit 14 to provide the standby unit 34 with the various signals needed to achieve and maintain synchronization.

The active unit demultiplexer 250 connects to the standby unit demultiplexer 252 over connection 254. The active unit processor 256 connects to the standby unit processor 258 over a connection 260. The active unit 14 is depicted generally with one line circuit 18. Additionally, the standby unit 34 is depicted generally with one line circuit 40. The active unit DSP 262 connects to the standby unit DSP 264 over a connection 266. The active unit DSL circuit 268 connects to the standby DSL circuit 270 over a connection 272. The active unit power supply isolation 274 connects to the standby unit power supply isolation 276 over a connection 278.

The active unit 14 is generally depicted with one line circuit 18 connecting to one line circuit 40 in the standby unit 34. However, as was previously discussed, the active unit 14 and the standby unit 34 may each include more than one line circuit. Each of the line circuits in the active unit 14 may be connected with a corresponding line circuit in the standby unit 34. The connection between the line circuits in the active unit 14 and the line circuits in the standby unit 34 can allow all of the line circuits in the standby unit 34 to be synchronized with all the line circuits in the active unit 14. Although the different line circuit pairs are synchronized, the different line circuit pairs may have different states from the other line circuit pairs.

Figure 6:
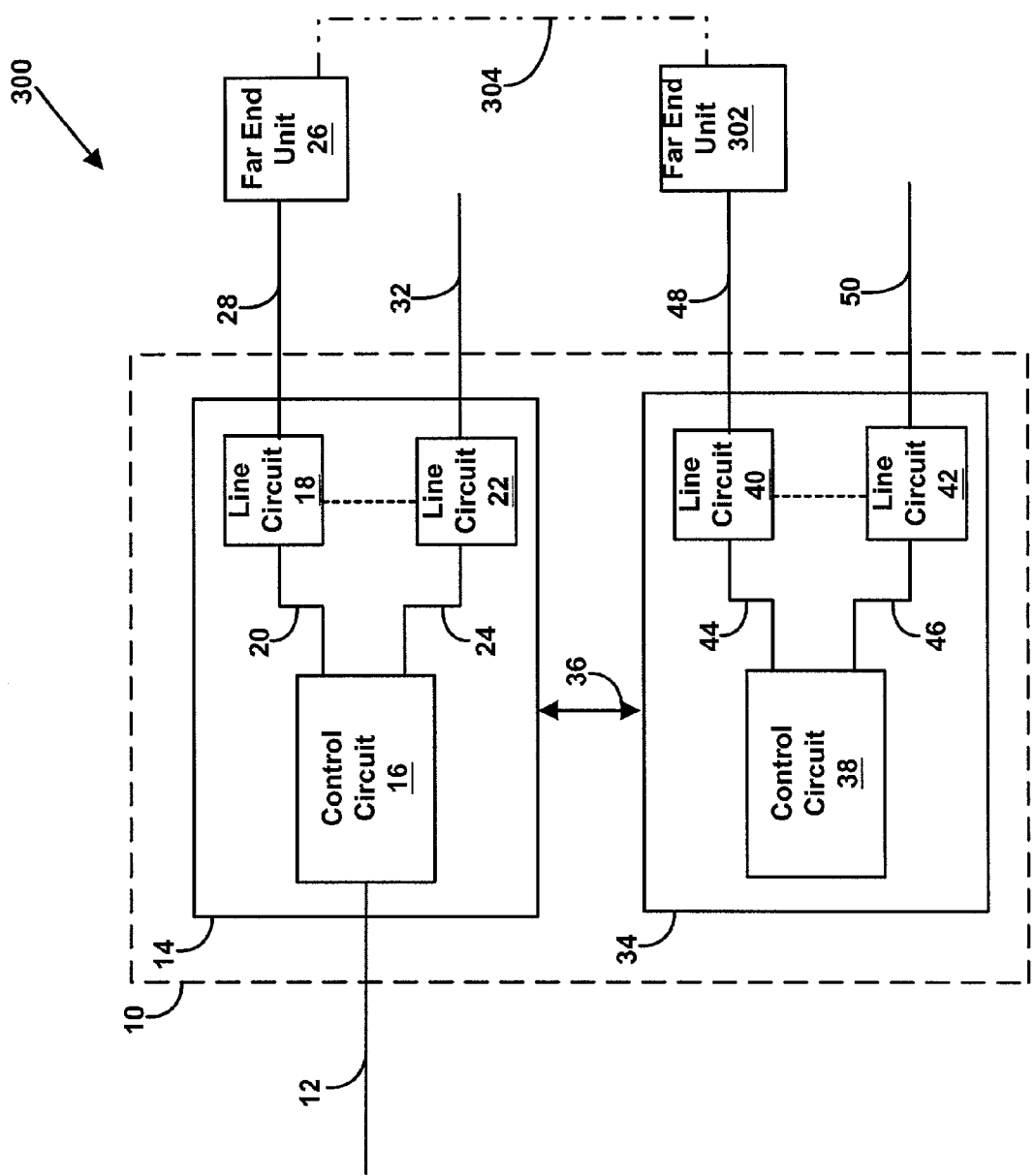
FIG. 6 shows an alternate embodiment of the XDSL transmission system of FIG. 1.

FIG. 6 shows an alternate configuration of the XDSL transmission system of FIG. 1. Similarly to FIG. 1, the active unit 14 and the standby unit 34 are connected to each other. For example, one line circuit 18 in the active unit 14 can be connected to another line circuit 40 in the standby unit 34. Also, a second line circuit 22 in the active unit 14 can be connected to a second line circuit 42 in the standby unit 34. The active unit 14 and the standby unit 34 may also include additional line circuits, and these may also be connected. Additionally, other connections may be used to link the active unit 14 with the standby unit 34. The connections between the active unit 14 and the standby unit 34 can be used to synchronize the standby unit 34 with the active unit 14.

The line circuits 18, 22 in the active unit 14 may also connect to far end units. FIG. 6 shows one exemplary connection between one line circuit 18 and a far end unit 26, and similar connection may occur for the other line circuits 22. For example, the line circuit 18 can connect to the far end unit 26 over a transmission line 28 to form an XDSL loop. Then, the far end unit 26 and the line circuit 18 can exchange data over the connection using an XDSL protocol. Data received by the line circuit 18 from the far end unit 26 may be used to update the state of the line circuit 18, and this may also have an effect on the states of the other components in the active unit 14.

The line circuit 40 in the standby unit 34 may also connect to a far end unit 302, and this is different than was depicted in FIG. 1. Line circuit 40 in the standby unit 34 corresponds to line circuit 18 in the active unit. The far end unit 302 may also connect to the corresponding far end unit 26 over a data link 304. In this configuration, the connections 36 between the active unit 14 and the standby unit 34 can be used to synchronize the two units. When data is transmitted form the far end unit 26 to the line circuit 18, the line circuit may update its state based on the data. In order for the other line circuit 40 to remain synchronized with the active line circuit 18, it should also update its state.

The far end unit may logically connect with the standby far end unit, shown by the logical connection 304. The standby far end unit 302 can obtain the data sent from the active far end unit 26 to the line circuit. This can be done over the physical data link 260 connecting the processors 256, 258, and the logic data link 266 connecting the active and standby line circuits 262, 264. The far end unit 302 can then use the data to simulate and match the signal received by the line circuit 18. The standby far end unit 302 can make a simulated transmission signal, which when received by the standby line circuit 40, will be similar to the signal received by the other line circuit 18. By receiving this signal, the line circuit 40 can update its state, and its state will reflect the state of the corresponding line circuit 18 in the active unit 14. A similar process can occur for the other line circuit pairs in the active and standby units.

Figure 7:
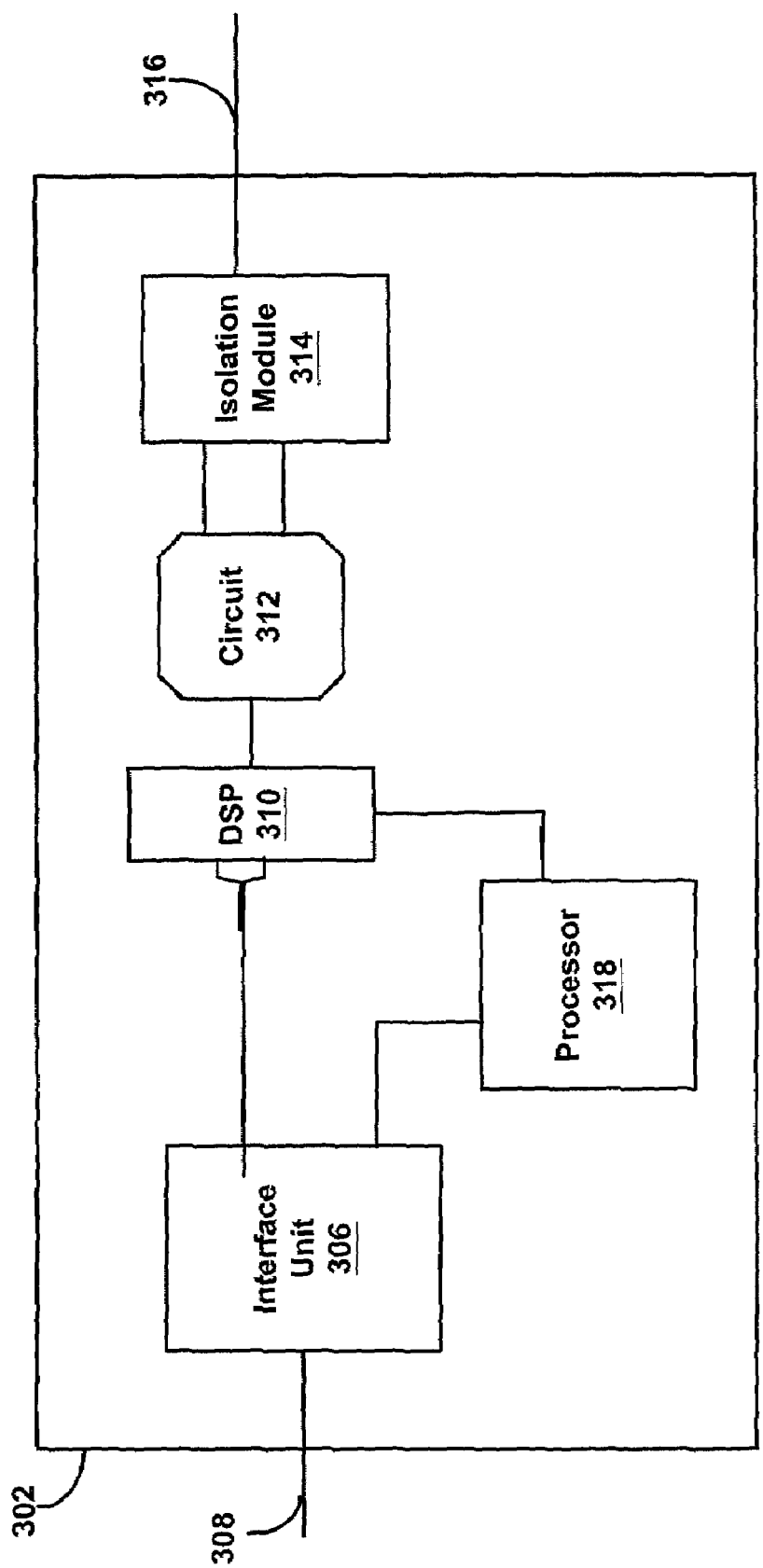
FIG. 7 is an exemplary far end unit that may be used in the XDSL transmission system of FIG. 1.

FIG. 7 is an exemplary far end unit that can be used as the standby far end unit 302 connected to a line circuit 40 in the standby unit 34. The standby far end unit 302 may include an interface unit 306. The interface unit 306 may receive input from an input line 308, which may in turn connect to the line circuit 40 in the standby unit 34. The interface unit may connect to a DSP 310. The DSP 310 may perform various different processing functions on the signals received over the input line 306 and on signals sent out over the input line 306. The DSP 310 can connect through a circuit 312 and an isolation module 314 to an output line 316. The output line 316 may in turn connect to an XDSL device, such as an XDSL modem.

The standby far end unit 302 may also include a processor 318, which can be used to execute logics modules. The processor 318 may access data storage, such as a hard disk. The data storage may store one or more logic modules, which may be executed on the processor 318. Of course, the standby far end unit 302 may include additional memory or circuitry in addition to the previous described components.

The standby far end unit 302 may include the same circuitry as the active far end unit 26 with additional software control; however, it is also possible that its circuitry may differ from that of the corresponding active far end unit 26. The software control may run in the processor 318, and it may allow for the modification of the line signal sent to the line circuit 40. The modification may be made such that the signal received by the line circuit 40 matches the signal received by the corresponding line circuit 18 in the active unit 14.

The standby far end unit 302 can obtain the necessary state and status information from the active and standby line circuits using the physical connections. The physical connections can link the processors from the active unit 14, the standby unit 34 and the standby far end unit 302. Logically, a connection may be created between the two DSPs 262, 264 and the processor in the standby far end 302. The connection can then establish a virtual logical connection between the far end unit 26 and the far end unit 302. Since the processor 318 in the standby far end 302 may be able to create a digital representation of a signal, it may also be able to create or match a signal. The far end unit 302 may optionally utilize more than one processor to perform this functionality.

Figure 8:
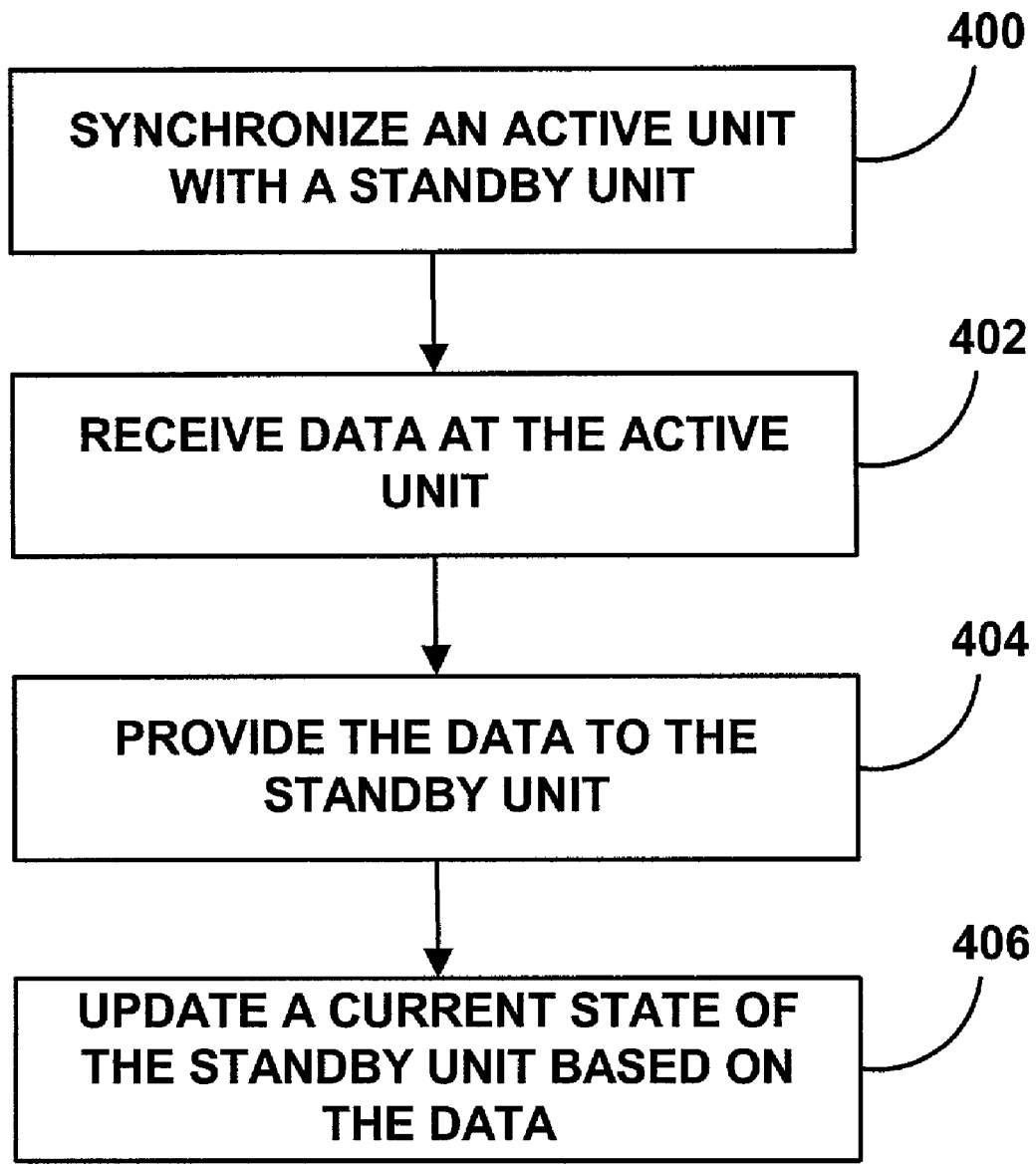
FIG. 8 is a flow chart of an exemplary process for the operation of the network interface of FIG. 1.

FIG. 8 is a flow chart of an exemplary process for operation of the network interface of FIG. 1. At Step 400, the standby unit 34 synchronizes with the active unit 14. The standby unit 34 may be synchronized with the active unit 14 over the connections between the two units. For example, with reference to FIG. 5, the standby line interface unit 252 may be synchronized with the active line interface unit 250 using the physical connection 254 between the two units. The inputs and outputs of the standby line interface unit 252 may be matched to the inputs and outputs of the active line interface unit 250 so that the two units are in the same state.

Additionally, each line circuit in the standby unit 34 may be synchronized with its corresponding line circuit in the active unit 14. For example, line circuit 40 may be synchronized with line circuit 18. In one exemplary embodiment of synchronization, the DSP 264 in the standby circuit 34 may be synchronized with the DSP in the active circuit 18. The various analog circuit components in the standby line circuit 40 may also be synchronized with the analog circuit components in the corresponding active line circuit 18. The synchronization of the two line circuits 18, 40 may be performed, for example, by the active unit processor 256 and the standby unit processor 256.

In one exemplary embodiment, the DSPs 262, 264 may include a variety of volatile and non-volatile memory. Additionally, they may include a number of different registers or other logic elements that can be used in performing computation and processing functions. The memory, registers, logic elements, or other components may be set to various different values. For example, the memory and registers may each store different numeric values, such as binary numbers. The values stored by the memory and registers can be part of their current state. In synchronizing the standby DSP 264 with the active DSP 262, the values stored by these internal components may be matched between the two DSPs 262, 264. For example, the memory and register values of the standby DSP 264 may be set to match the memory and register values of the active DSP 264. Other components may also be synchronized between the two DSPs 262, 264, and this may be dependant on the particular types of DSPs that are used in the circuits 18, 40.

The active DSP 262 may also store various information about the XDSL system, and this information may be used in updating the state of the active unit 14. In one exemplary embodiment, the active DSP 262 may store configuration information for the DSL loop. For example, it may store different line rates used in the DSL loop, it may store transmit powers used in the DSL loop, or it may store other configuration information.

In addition to storing configuration information, the active DSP 262 may also store performance monitoring information for the DSP loop. For example, it may store signal-to-noise ratios and attenuation information. It may also store the number of data bits transferred in the DSL loop, or it may store other information. This information can be used in the operation of the DSL loop, and it may have an effect on the current states of the active unit 14.

The active DSP 262, for example, may store the configuration information and the performance monitoring information in its memory. This information may be stored in the active DSP's volatile memory, its non-volatile memory or a combination of the two types of memory. In synchronizing the standby DSP 264 with the active DSP 262, the configuration information and the performance monitoring information may be transferred to the standby DSP 264.

The standby DSP 264 may be synchronized with the active DSP 262 through the logical connection 266 linking the two DSPs 262, 264. In one exemplary process for synchronization, the active DSP 262 and the standby DSP 264 may each run an active program module and a standby program module. The active program module may generally perform the computations task to support communication with a far end unit. The standby program module may generally perform tasks related to the synchronization with another DSP.

For example, the standby program module in the active line circuit 18 may monitor the program sequences in the active program module, and it may relay them to the processor 256. The processor 256 in the active unit 14 may then pass the program sequences to the processor in the standby unit 34. The standby unit processor 258 may then relay the program sequences to the standby program module running in the DSP 264. Then, the standby program module in the DSP 264 may adjust the active program module until the active program module in the DSP 264 is synchronized with the active program module of the DSP 262 in the active unit 14.

In order to provide synchronization between the active unit 14 and the standby unit 34, the standby circuit 270 may also be synchronized with the active circuit 268 using the connection 272 between the two circuits 268, 270. The standby circuit 270 may include various analog components used in the line circuit 40 to provide functionality, such as isolation, amplification and filtering. Of course, the line standby circuit 270 may perform other functions. The standby circuit 270 components can be synchronized with the corresponding active circuit components 268. They may be synchronized, for example, by matching the voltage levels between the two circuits 268, 270. Similarly, the standby supply isolation 276 can be synchronized with the active supply isolation 274, for example by matching analog voltage levels.

Then, at Step 402, the active unit may receive data 402. In one exemplary embodiment, the active line circuit 18 may receive data from a far end unit. The data may cause the active unit change its state. For example, the data may affect the analog voltage values in the span supply isolation 274 or in the active circuit 268. Additionally, the DSP 262 may record the data, and this may alter various states within the DSP 262. Of course, other states in the line circuit 18 and the active unit may also change.

At Step 404, the active unit provides the data to the standby unit. In an exemplary embodiment, the active unit 14 can provide data to the standby unit 34 through the connections 254, 260, 266, 272, 280 between the two units 14, 34. Then, based on the data received from the active unit 14, the standby unit 34 can update its current state to match the state of the active unit 14, shown at Step 406. This process can continue for data sent and received form the active unit 14, so that throughout operation of the active unit 14 the standby unit 34 can remain synchronized. Since the standby unit 34 remains synchronized with the active unit 14, the XDSL system can seamlessly switch between the two units. For example, the XDSL system may switch between the two units in the event of an indication, such as a fault.

Figure 9:
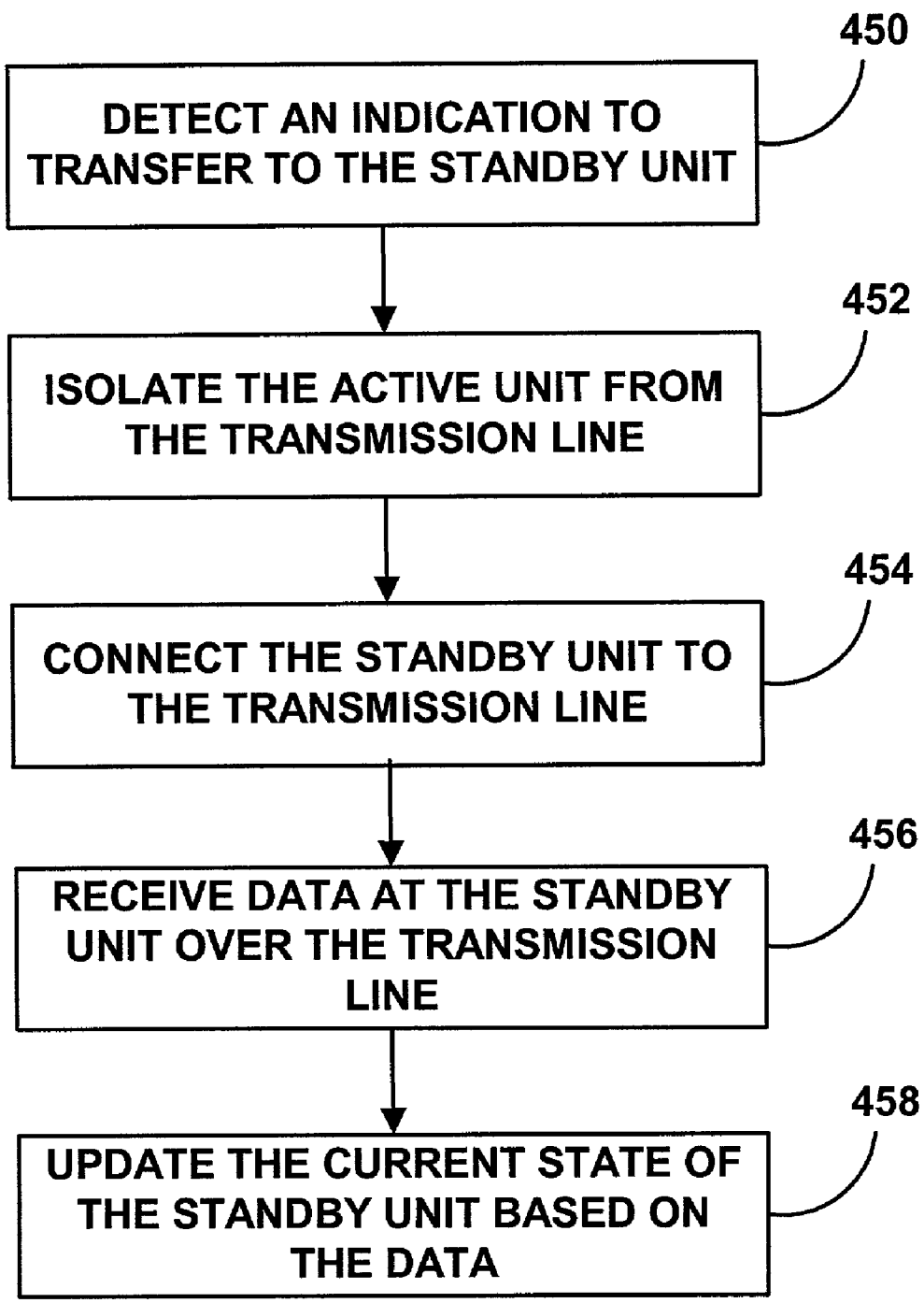
FIG. 9 is an exemplary process for switching between an active unit and a standby unit in the network interface of FIG. 1.

FIG. 9 is an exemplary process for switching between the active unit and the standby unit. At Step 450, the system detects an indication to switch from the active unit to the standby unit. The indication may come from a variety of different sources. In one exemplary embodiment, the indication may be triggered manually by an operator or other technician. For example, the system may receive a remote command through the craft port. In yet another embodiment, the indication can be automatically provided.

For example, a fault may occur when the bit error rate exceed a predetermined value, The bit error rate can be the number of bits that are incorrectly transmitted or received in the XDSL system compared to the total number of bits transmitted or received in the XDSL system. Of course, the bit error rate can be defined in a variety of other different ways.

An increase in the bit error rate can cause a number of adverse consequences. For example, an increased bit error rate can results in erroneous data received by a line circuit or by a far end unit (i.e., due to the bit errors). In another example, the XDSL system may provide for retransmission of incorrect data, but this may decrease the overall transmission rate in the XDSL system. Since more of the bandwidth may be used for retransmission of signals, the overall data rate can correspondingly decrease. The fault then can signify an unacceptable decrease on the overall performance of the XDSL system.

In another example of a fault, a fault may occur when an out of service condition occurs. An out of service condition may be determined in a number of different ways. For example, the out of service condition may occur when the bit error rate exceeds a certain threshold. The out of service bit error rate threshold may be greater than the bit error rate for generally trigger a fault (i.e., it is possible to have a bit error rate that triggers a fault but that does not rise to the level of an out of service condition). In another example, an out of service condition may occur when a physical problems develops within the XDSL system that may prevent data from being transmitted. For example, circuit in a line circuit or in a far end unit may fail so that it can no longer send or receive data. In another example, a problem may develop in a transmission line so that the transmission line is no longer capable of carrying data. Of course, other conditions may also occur than can cause an out of service condition.

In yet another example of a fault, the signal-to-noise ratio in the XDSL system may fall below a predetermined value. The signal-to-noise ratio can affect the transmission rate of data within the XDSL system. As the signal-to-noise ratio decreases, it becomes increasingly difficult to separate the noise in the XDSL system from the data signals. If the signal-to-noise ratio falls past a certain value than it may even become impossible to transmit data within the XDSL system. Other ways also exists to signal a fault, and these may also be used.

At Step 452, the active unit can be isolated from the transmission line. Then, at Step 454, the standby unit can be connected to the transmission line. While these are depicted as separate steps, they may be performed simultaneously. Alternatively, they may be performed in a different order. For example, the standby unit may be connected to the transmission line before the active unit is isolated from the transmission line.

By isolating the active unit 14 from the transmission line and connecting the standby unit 34 to the transmission line, the standby unit 34 can communicate with the far end units that were previously connected to the active unit 14. For example, with reference to FIG. 1, one far end unit 26 can be disconnected from the line circuit 18. The other far end unit 30 may also be disconnected from its line circuit. The first far end unit 26 can be correspondingly connected to the line circuit 40 in the standby unit 34, and the second far end unit 30 can also be correspondingly connected to the line circuit 42 in the standby unit 34.

At Step 456, the standby unit receives data over the transmission line. For example, one line unit 40 can now connect over the transmission line 48 to the far end unit 26. It should be understood that the transmission line 48 may connect to the other transmission line 28 so that communication between the far end unit 26 and the line circuit 40 may use all or part of both transmission line 28, 48. Alternatively, it is possible that the line circuit 40 is switched directly to the previous transmission line 28 and that the other transmission line is not used at all 48. Of course, it is also possible that the line circuit 40 connect to the far end unit over the transmission 48 line and that the original transmission line 28 is not used at all. Other methods of connection are also possible, and these may also be used.

The switch between the active unit 14 and the standby unit 34 can appear seamless to the far end units. The standby unit 34 can be switched in to replace the active unit 14. The far ends units can continue to communicate with the standby unit 34, and since the state of the standby unit 34 is synchronized to the state of the active unit 14 there can be no noticeable disruption to the far end units.

Advantageously, the change between the active unit 14 and the standby unit 34 can occur quickly. Since the standby unit 34 can be synchronized with the active unit 14, the switch between the units can occur based on the time necessary for the physical switching to occur. The synchronization between the two units 14, 34 can eliminate the need to run a separate synchronization process when the standby unit 34 is switch to connect to the far end units. The speed of the change between the active unit 14 and the standby unit 34 can help prevent disruptions in the XDSL system.

In one exemplary embodiment, the active unit 14 may include a number of different line circuits, and each line circuit may be used to establish a session with a far end unit. A session may carry voice, data or other information. For a voice call, a user may be able to notice a disruption in service if the disruption is for a sufficient period of time. For example, the ear may be able to detect service disruptions greater than 50 ms, while service disruptions less than 50 ms may go unnoticed.

In the XDSL system, for example, a fault may occur on one of the XDSL loops. In order to continue to provide service, the standby unit 34 may switch with the active unit 14. When the switch occurs, the XDSL loop with the fault can be replaced with a different line circuit and a different connection to the far end unit. Similarly, all the other XDSL loops that weren't affected by the fault are also changed from the active unit 14 to the standby unit 34.

The various XDSL standards can specify a resynchronization process between the far end units and the line circuits for a switch between line circuits, such as caused by a switch from the active unit 14 to the standby unit 34. The various XDSL synchronization processes can be on the order of thirty seconds. This can be a substantial disruption in service to the far end units that are not directly affected by the fault. For example, in a voice conversation, a thirty second disruption of service can be clearly noticeable to the participants.

The synchronization between the active unit 14 and the standby unit 34 may eliminate the need for the synchronization process. Since the state of the standby unit 34 can match the state of the active unit 14, the switch between the two units can occur without disrupting service with the far end units. When the far end unit interface with the standby unit 34, its state is the same as the previous state of the active unit 14, thereby eliminating the need for synchronization.

Figure 10:
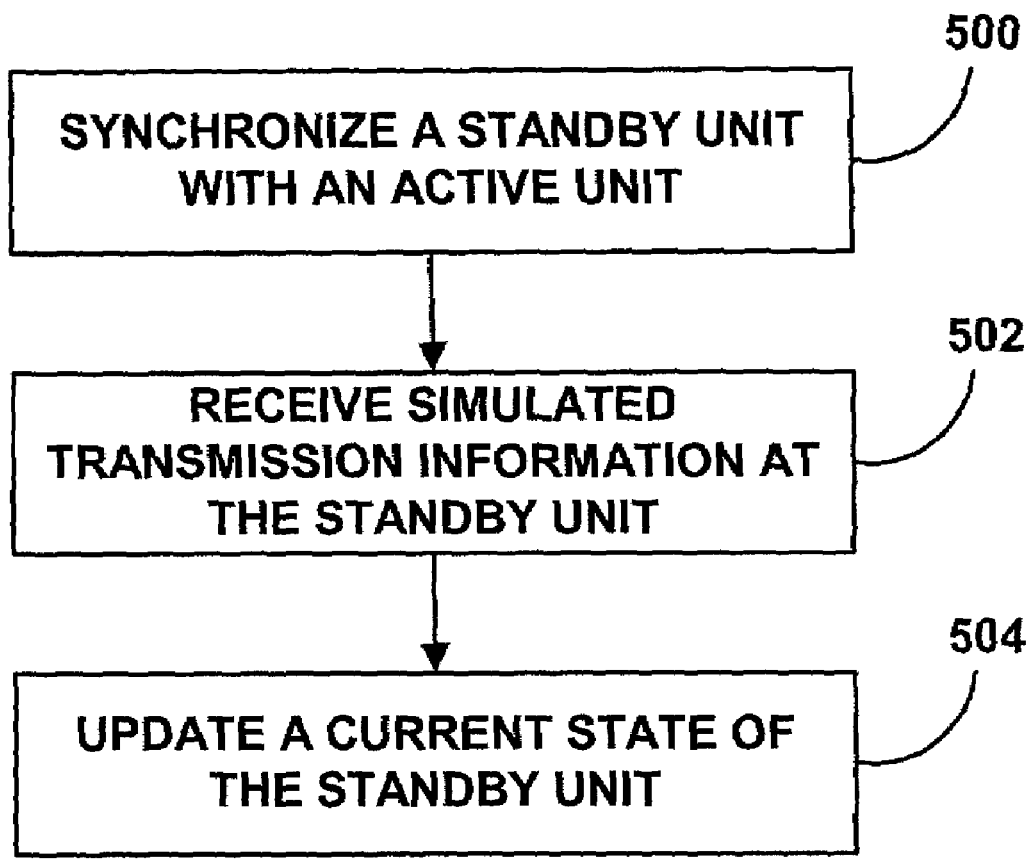
FIG. 10 is a flowchart of an exemplary operation of the network interface of FIG. 6.

FIG. 10 is a flowchart of an exemplary operation of the network interface of FIG. 6. At Step 500, the standby unit synchronizes with an active unit. Then, at Step 502, the standby unit receives simulated transmission information from the standby far end unit. Finally, at Step 504, the standby unit updates its current state based on the information received from the far end unit.

Figure 11:
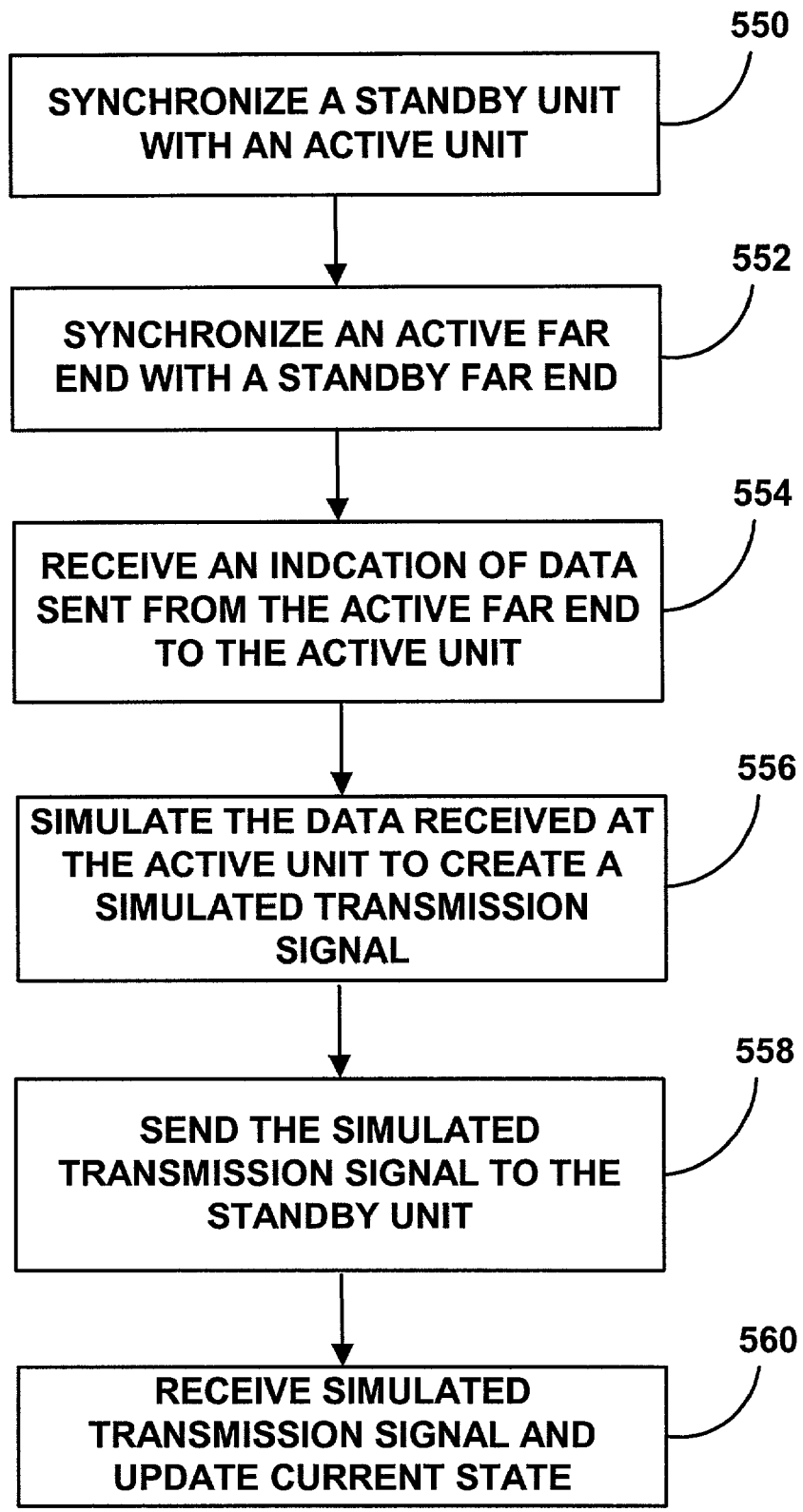
FIG. 11 is a flowchart of an exemplary process for updating the current state of the standby unit of FIG. 6.

FIG. 11 is a flowchart of an exemplary process for providing simulated data to the standby unit. At Step 550, the standby unit is synchronized with the active unit. Then, at Step 552, an active far end unit is synchronized with a standby far end unit. The active far end unit and the standby far end unit may each include a processor, such as a DSP. In order to synchronize the standby far end unit with the active far end unit, the two processors may be synchronized. This may be done using a process, such as the one previously described. Additionally, the standby far end unit and the active far end unit may include other logic elements or analog circuits that may also be virtually synchronized between the two units.

In order for the standby unit to maintain synchronization with the active unit, the signal spectra received by the standby unit should match the signal spectra received by the active unit. By making the signal spectra the same, the states of the active unit and the standby unit can process similarly. If the active unit and the standby unit were to receive different signals from their respective far end units, then the states of the active and standby units may diverge and therefore prevent seamlessly transfer between the two units.

In order to allow the states to progress similarly, the standby far end unit can receive information about the quality of the signal transmitted from the active far end unit to the active unit. The standby far end unit may also receive an indication of the data sent from the far end unit to the active unit, shown at Step 554. Then, the standby far end unit can simulate the signal spectra received at the active unit, shown at Step 556. The standby far end unit may take into account various different considerations when simulating the spectra. For example, it may take into account the signaling protocol used, the signal-to-noise ratio of the transmission line, the length of the transmission line, the physical design of the transmission line or other characteristics.

Then, the standby far end unit can formulate a simulated transmission signal that can be transmitted to the standby unit. The simulated transmission signal may be formed so that when it is received at the far end unit, its signal spectra matches the signal spectra of the signal received at the active unit. In order to create the simulated transmission signal, the standby far end unit may also take into account the signal-to-noise ratio, the length, the physical design and other characteristics of the transmission line connecting the standby far end unit with the standby unit.

At Step 558, the standby far end unit sends the simulated transmission signal to the standby unit. Finally, at Step 560, the standby unit receives the simulated transmission signals and it updates its current state. Since the signal spectra of the received simulated transmission signal can match the signal spectra of the signal received at the active unit, the updated state of the standby unit can match the current state of the active unit.

Figure 12:
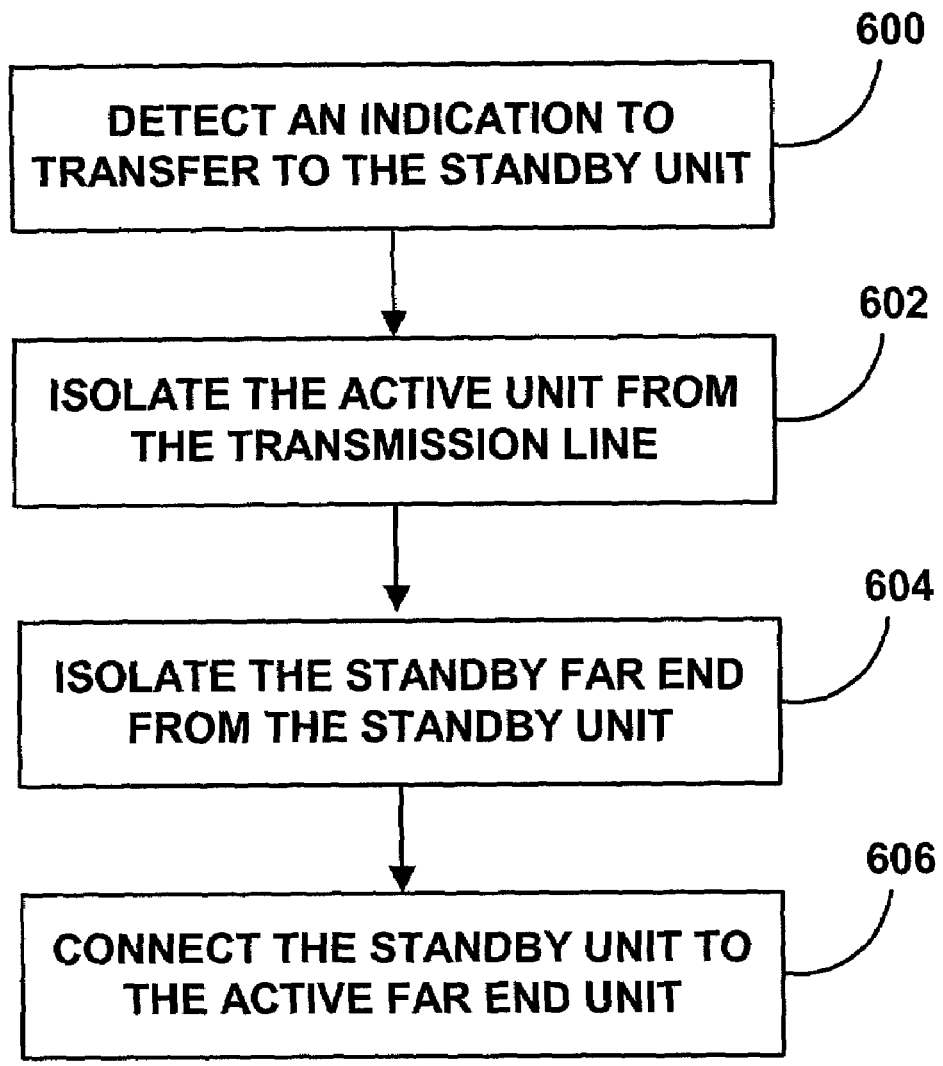
FIG. 12 is a flowchart of a process for switching between the active unit and the standby unit of FIG. 6.

FIG. 12 is a flowchart of a process for switching between the active unit and the standby unit. At Step 600, the transmission system detects an indication to switch from the active unit to the standby unit. As previously described, the indication may be a manual indication from an operator, such as a technician. Alternatively, the indication may be a fault, or it may be generated automatically in response to a fault.

Then, at Step 602, the active unit is isolated from the active far end unit. At Step 604, the standby unit is isolated from the standby far end unit, and then, at Step 608, the standby unit is connected to the active far end unit. While these are depicted as separate steps, the may alternatively be performed simultaneously or in a different order. Then, the active far end unit can continue to communicate seamlessly with the standby unit. Since the state of the standby unit mirrors the state of the active unit, the active far end unit can connect to the standby unit without having to perform the time-consuming initialization process.

It should be understood that the programs, processes, methods and apparatus described herein are not related or limited to any particular type of computer or network apparatus (hardware or software), unless indicated otherwise. Various types of general purpose or specialized computer apparatus may be used with or perform operations in accordance with the teachings described herein. While various elements of the preferred embodiments have been described as being implemented in software, in other embodiments in hardware or firmware implementations may alternatively be used, and vice-versa.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more, fewer or other elements may be used in the block diagrams.

The claims should not be read as limited to the described order or elements unless stated to that effect. In addition, use of the term "means" in any claim is intended to invoke 35 U.S.C. §112, paragraph 6, and any claim without the word "means" is not so intended. Therefore, all embodiments that come within the scope and spirit of the following claims and equivalents thereto are claimed as the invention.

I claim:

1. A method for performing a switchover in an XDSL system, the method comprising:
    synchronizing a standby unit to an active unit, wherein the active unit connects with a far end unit over a transmission line, wherein the active unit includes a processor and analog circuits, wherein the standby unit includes a processor and analog circuits, and wherein synchronizing the active unit with the standby unit comprises:
        synchronizing the processor in the standby unit to the processor in the active unit; and
        synchronizing the analog circuits in the standby unit to the analog circuits in the active unit;
    receiving a first transmission signal at the active unit from the far end unit;
    providing the first transmission signal from the active unit to the standby unit; and
    updating a current state of the standby unit based on the first transmission signal.

2. The method of claim 1, further comprising:
    detecting an indication within the XDSL system to switch from the active unit to the standby unit;
    isolating the active unit from the transmission line; and
    connecting the standby unit to the transmission line.

3. The method of claim 2, wherein the indication is a fault.

4. The method of claim 2, further comprising:
    receiving a second transmission signal at the standby unit from the far end unit over the transmission line; and
    updating the current state of the standby unit based on the second transmission signal.

5. The method of claim 1, wherein synchronizing the standby unit with the active unit comprises:
    sending state information from the active unit to the standby unit.

6. The method of claim 5, wherein the state information includes performance monitoring information.

7. The method of claim 5, wherein the state information includes configuration information.

8. The method of claim 1, wherein the processor in the active unit stores state information, wherein the state information is stored in a database, and wherein synchronizing the processor in the active unit further comprises:
    accessing the state information stored in the database; and
    sending the state information to the standby unit.

9. The method of claim 8, wherein the state information includes performance monitoring information for the transmission line.

10. The method of claim 8, wherein the state information includes configuration information.

11. The method of claim 8, wherein the state information includes a signal-to-noise ratio and an attenuation characteristic for the transmission line.

12. The method of claim 8, wherein the state information includes a line rate for the transmission line, a transmit power, and a target margin.

13. The method of claim 1, wherein synchronizing the processor in the standby interface with the processor in the active unit comprises:
sending a current state of the processor in the active unit to the processor in the standby interface; and
setting a current state of the processor in the standby unit to reflect a current state of the processor in the active unit.

14. The method of claim 1, wherein the transmission line carries TDM signals.

15. The method of claim 1, wherein the XDSL system is an ADSL, G.SHDSL, VDSL, SDSL, HDSL, HDSL2 or HDSL4 system.

16. A method for providing redundancy in an XDSL system, the method comprising:
receiving state information for an active unit;
setting a current state for a processor in a standby unit using the state information for the active unit;
receiving simulated transmission information from a far end unit, wherein the simulated transmission information represents data received from the far end unit at the active unit; and
updating the current state for the processor based on the simulated transmission information received from the far end unit.

17. The method of claim 16, wherein the state information includes performance monitoring information.

18. The method of claim 16, wherein the state information includes configuration information.

19. The method of claim 16, wherein the XDSL system is an ADSL, G.SHDSL, VDSL, SDSL, HDSL, HDSL2 or HDSL4 system.

20. A method for synchronizing a standby unit in an XDSL system, the method comprising:
obtaining a first data signal transmitted to an active unit over a first transmission line;
estimating a signal spectrum for the first data signal as received at the active unit;
creating a second data signal, wherein the second data signal represents the signal spectrum of the first data signal as received at the active unit; and
transmitting the second data signal to the standby unit over a second transmission line.

21. A computer readable medium having stored therein instructions for causing a central processing unit to execute the method of claim 20.

22. The method of claim 20, wherein the first and second transmission lines carry TDM signals.

23. The method of claim 20, wherein the XDSL system is an ADSL, G.SHDSL, VDSL, SDSL, HDSL, HDSL2 or HDSL4 system.

24. A method for switching between line circuits in a TDM system, wherein the TDM system includes a plurality of line circuits in an active unit, wherein each of the plurality of line circuits connects to a different far end unit, wherein the TDM system further includes a plurality of line circuits in a standby unit, wherein each of the plurality of circuits in the active unit corresponds to one of the plurality of circuits in the standby unit, and wherein the standby unit connects to the active unit, the method comprising:
synchronizing the plurality of line circuits in the standby unit with the plurality of line circuits in the active unit;
receiving data for at least one line circuit in the active unit from the far end unit;
updating a current state of the at least one line circuit in the active unit based on the data received from the far end unit; and
updating a current state of a corresponding line circuit in the standby unit to reflect the current state of the at least one line circuit in the active unit.

25. The method of claim 24, wherein updating the current state of the corresponding line circuit comprises:
receiving signals over at least one connection between the active unit and the standby unit; and
updating the current state of the corresponding line circuit based on the signal received over the connection.

26. The method of claim 25, further comprising:
receiving an indication to switch from the active unit to the standby unit;
disconnecting the active unit from the far end units; and
connecting the standby unit to the far end units.

27. The method of claim 26, wherein the indication is a fault.

28. The method of claim 24, wherein the plurality of line circuits in the standby unit each connect to a different standby far end unit, wherein updating the current state of the corresponding line circuit comprises:
receiving a simulated transmission signal from the standby far end unit connected to the corresponding line circuit; and
updating the current state of the corresponding line circuit based on the simulated transmission information received from the standby far end unit.

29. The method of claim 28, further comprising:
receiving an indication to switch from the active unit to the standby unit;
disconnecting the active unit from the far end units;
disconnecting the standby unit from the standby far end units; and
connecting the standby unit to the far end units.

30. The method of claim 29, wherein the indication is fault.

31. The method of claim 24, wherein the TDM system is an XDSL system.

* * * * *